C. MACBETH.
MANUFACTURE OF THE INNER TUBES OF PNEUMATIC TIRES.
APPLICATION FILED APR. 1, 1919.
1,323,706. Patented Dec. 2, 1919.
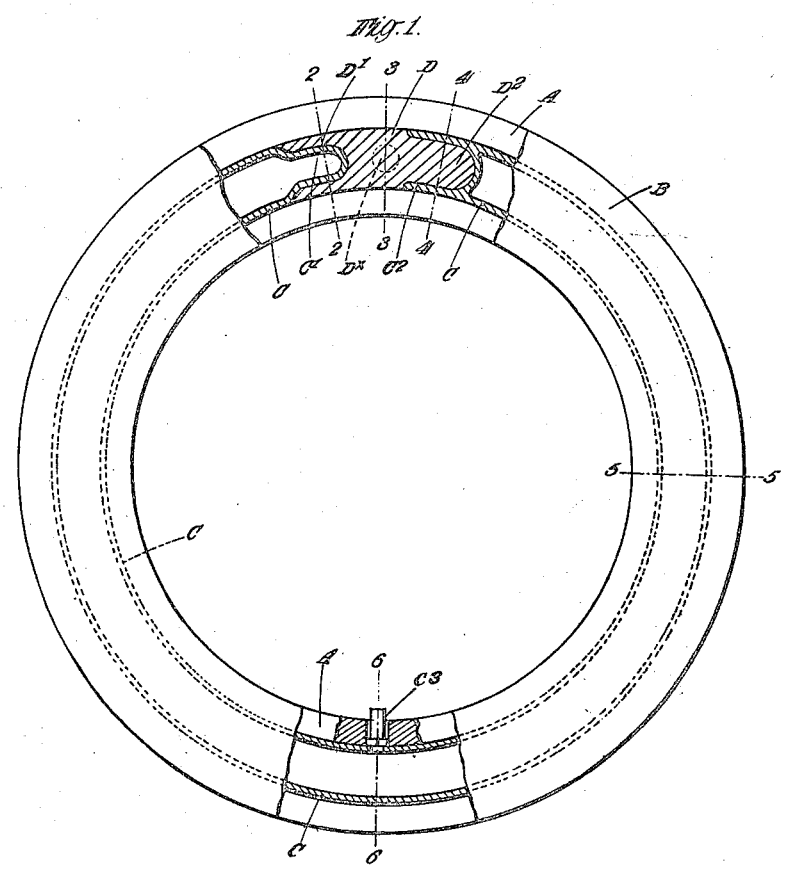
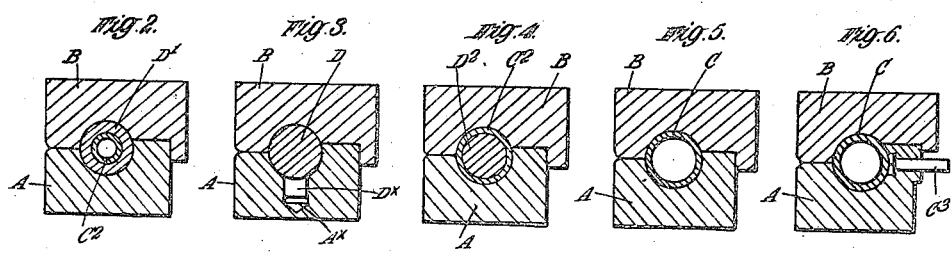
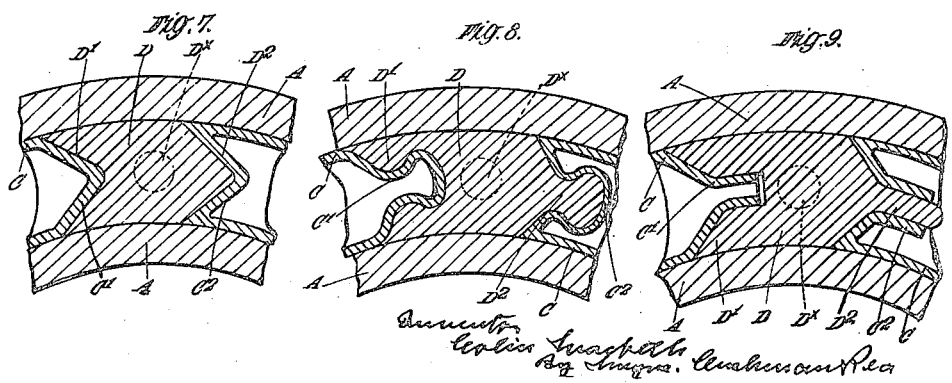

UNITED STATES PATENT OFFICE.

COLIN MACBETH, OF BIRMINGHAM, ENGLAND, ASSIGNOR TO THE DUNLOP RUBBER COMPANY, LIMITED, OF WESTMINSTER, LONDON, ENGLAND.

MANUFACTURE OF THE INNER TUBES OF PNEUMATIC TIRES.

1,323,706.     Specification of Letters Patent.     Patented Dec. 2, 1919.

Application filed April 1, 1919. Serial No. 286,746.

*To all whom it may concern:*

Be it known that I, COLIN MACBETH, a subject of the King of Great Britain, residing at Para Mills, Aston Cross, Birmingham, in the county of Warwick, England, have invented certain new and useful Improvements in or Relating to the Manufacture of the Inner Tubes of Pneumatic Tires, of which the following is a specification.

This inventon relates to the manufacture of inner tubes for pneumatic tires and has particular reference to an improved method of and apparatus for molding and vulcanizing tubes having butt or interfitting ends.

According to this invention the uncured tube body is formed or provided with the desired shape or formation of butt or interfitting ends and with the valve patch portion and the tube so formed is then maintained in circular form with its ends suitably separated and while in this condition is vulcanized, so that the tube body, the butt ends and the valve patch portion are all cured at the same time thus avoiding two or more vulcanizing operations as required in the usual or known processes of making butt ended tubes. For the purpose of this invention the male and female ends of the uncured tube are respectively fitted into and on to correspondingly shaped ends of a device hereinafter referred to as the "core piece" which is thus interposed between and separates the two ends of the tube. The tube with its ends applied or fitted to the interposed core piece and provided with a valve patch portion is then placed within a circular mold and it is inflated with steam or other fluid pressure through a valve secured to the tube; after completion of the cure the steam is exhausted from the tube, and the tube with the core piece is then removed from the mold, and the tube ends are withdrawn or removed from the core piece. The mold may comprise an upper and lower part both of which are grooved to receive between them the inner tube and the aforesaid core piece, which latter is curved to correspond with the circular form of the mold and is retained in a definite position therein by any suitable means such, for example, as a pin on the core piece engaging in a hole in one of the mold parts.

In order that the said invention may be clearly understood and readily carried into effect the same will be more fully described with reference to the accompanying drawings, in which:—

Figure 1 is a part sectional plan of a mold containing one construction of the core piece and an inner tube having its ends applied to the core piece.

Figs. 2 to 6 are cross sectional views taken respectively on the lines 2—2, 3—3, 4—4, 5—5, and 6—6 of Fig. 1.

Figs. 7, 8 and 9 illustrate three further shapes or forms of core pieces.

A represents the lower mold part and B the upper mold part, which parts are provided with semi-circular annular grooves to form a circular space to receive the inner tube C and the core piece D. As shown in Figs. 1 and 3 the core piece is provided with a pin $D^x$ which fits into a hole $A^x$ in the lower mold part A. One end $D'$ of the core piece is recessed or hollowed out to receive the male end $C'$ of the inner tube and the other end $D^2$ of the core piece is reduced to receive the female end $C^2$ of the tube. Prior to the placing of the tube C and the core piece D in the mold, the two ends of the inner tube while in the unvulcanized state are fitted or applied in any suitable manner to the ends $D'$, $D^2$ of the core piece D so that one end $C'$ of the tube fits in the hollowed end $D'$ of the core piece while the other end $C^2$ surrounds the other end $D^2$ of the core piece. The tube C with its ends separated by the interposed core piece D is placed in the lower mold part in such position that the pin $D^x$ on the core piece fits in the hole $A^x$ in the lower mold part A, and the upper mold part B is then secured to the lower mold part in any appropriate manner such as by means of bolts, toggle links or hydraulic pressure. The tube may be provided with the valve patch and valve $C^3$ which passes or extends through a hole or opening in the lower mold part, see Figs. 1 and 6, so that after the tube and core piece have been placed in the mold the tube may be inflated with steam or other fluid, through the said valve. After complete vulcanization the steam or other fluid is exhausted from the tube and after the mold parts A and B have been separated, the tube and the core piece are together removed when the two ends of the tube can be withdrawn or separated from the core piece. The form of butt ends shown in Fig. 1 is a usual or common type and other forms of butt ends or interfitting or interlocking ends on the tube may be produced by providing suitably shaped core pieces. In the example illustrated in Fig. 7 the ends $D'$, $D^2$ of the core piece are more or less internally and externally coned respectively or approximately concave and convex to agree with correspondingly shaped ends $C'$ $C^2$ of the tube. As shown in Fig. 8 the core piece may be recessed at one end $D'$ to form a knob or projection on the end $C'$ of the tube while the other end $D^2$ of the core piece is formed with a knob or projection to form a corresponding recess in the other end $C^2$ of the tube. The example shown in Fig. 9 illustrates a core piece which is shaped with an internal recess and partial bore at one end $D'$ and a central projection on the other end $D^2$ so as to provide interfitting nozzle-like portions on the two ends $C'$ $C^2$ of the tube, which portions are formed with central openings to provide a throughway passage for the circulation of air around the tube when the latter is in use. A tube having any other type of butt interfitting or interlocking ends can be molded and vulcanized in one operation as hereinbefore set forth.

What I claim and desire to secure by Letters Patent of the United States is:—

1. The method of molding inner tubes having butt or interfitting ends, comprising applying to the ends of the tube in the unvulcanized state a core piece shaped to agree with the formation to be imparted to the ends of the tube, placing the tube and core piece so fitted together in a mold, and vulcanizing the tube, substantially as described.

2. The method of molding inner tubes having butt or interfitting ends, comprising applying the ends of the tube to a core piece, placing said core piece and tube in a mold, inflating the tube, and vulcanizing the tube substantially as described.

3. Apparatus for molding inner tubes having butt or interfitting ends, comprising a two part or other suitable mold and a core piece adapted to be placed between and to receive the ends of the tube substantially as described.

4. Apparatus for molding inner tubes having butt or interfitting ends comprising a two part or suitable mold in combination with a detachable core piece shaped to receive and to separate the ends of the tube, the core piece being adapted to be placed in the molding space and retained in a fixed position therein substantially as described.

5. For use in the manufacture of inner tubes having butt or interfitting ends a core piece which is shaped to correspond with the ends of the tube and is adapted to be interposed between the said ends when fitted or applied to the core piece substantially as described.

COLIN MACBETH.